UNITED STATES PATENT OFFICE.

JEAN JOSEPH AUGUSTE TRILLAT, OF PARIS, FRANCE, ASSIGNOR, BY MESNE ASSIGNMENTS, TO HAROLD H. FRIES AND ALBERT FRIES, CONSTITUTING FIRM OF FRIES BROS., OF NEW YORK, N. Y.

COMPOSITION FOR THE PRODUCTION OF VAPORS OF FORMIC ALDEHYDE.

SPECIFICATION forming part of Letters Patent No. 704,490, dated July 8, 1902.

Original application filed November 24, 1896, Serial No. 613,270. Divided and application filed December 29, 1897, Serial No. 664,394. Again divided and this application filed June 27, 1900. Serial No. 21,756. (No specimens.)

*To all whom it may concern:*

Be it known that I, JEAN JOSEPH AUGUSTE TRILLAT, a citizen of the Republic of France, and a resident of Paris, France, have invented a certain new and useful Composition for the Production of Vapors of Formic Aldehyde, of which the following is a specification.

This invention has been patented in France, No. 252,939, dated February 5, 1896, (certificat d'addition,) and No. 252,939, dated February 25, 1896, (certificat d'addition;) in Belgium, No. 122,120, dated June 24, 1896; in Austria, No. 446/3,175, dated August 12, 1896; in Brazil, No. 2,110, dated August 26, 1896; in Great Britain, No. 19,744, dated September 7, 1896; in Italy, No. 42,078, dated September 30, 1896; in Germany, No. 91,712, dated May 21, 1896; in Denmark, No. 1,176, dated July 1, 1896; in Spain, No. 19,289, dated July 1, 1896; in Hungary, No. 6,312, dated July 2, 1896; in Norway, No. 9,176, dated July 2, 1896; in Russia, No. 395, dated June 25 and July 7, 1896, and in the South African Republic, No. 1,244, dated November 4, 1896.

This application is a division of my application for production of vapors of formic aldehyde filed on or about November 24, 1896, Serial No. 613,270, (patented August 14, 1900, No. 656,061,) and of my application for production of vapors of formic aldehyde filed on or about December 29, 1897, Serial No. 664,394, (patented January 22, 1901, No. 666,579,) which is a division of said first-mentioned application.

In my said applications the process of producing formic aldehyde by subjecting a substance containing it to heat and pressure during the evolution of the formic-aldehyde vapors is claimed, and in the last-recited application the process of heating a substance containing formic aldehyde in connection with a salt neutral thereto is claimed.

The feature to which this application particularly pertains is a new composition of matter for producing formic-aldehyde vapors consisting of a neutral mixture of a substance containing formic aldehyde and a soluble substance neutral thereto.

As set forth in my said applications, up to the time of my invention no means had been found for generating in an efficient manner the vapors of formic aldehyde from its commercial forty-per-cent. solution, commonly known as "formalin" or "formol." The most simple process would inevitably be to heat the solution in the open air, so as to drive off the vapors; but an insurmountable obstacle is met in the fact that polymerization takes place rapidly and the solution is finally transformed into a solid substance, which, although more or less volatilizable at higher temperatures, only yields a variable quantity of non-polymerized formic-aldehyde vapors. This explains the want of success experienced prior to my invention in the application of formic aldehyde to the purposes of general disinfection.

In most sources of formic-aldehyde vapors there will be found both polymerized and unpolymerized formaldehyde, and the application of heat ordinarily will hasten polymerization. For practical disinfection the best advantages are obtainable with a non-polymerized gas. My invention aims to attain a gas having this advantageous condition, to provide simple and effective means for producing such gas commercially, so that it can be readily generated and employed where required for disinfecting purposes, and to provide means for evolving practically all of the gas existing in the source of supply, preventing its polymerization and depolymerizing its polymers, so that the cost of disinfection with this gas is reduced by avoidance of the loss of a large proportion of the gas heretofore lost by polymerization and by discharging the gas in the best possible condition for disinfection. As a means for realizing these ends my invention provides a new product for generating formic-aldehyde vapors, consisting of a material containing formic aldehyde and a soluble neutral or indifferent substance, preferably a mineral substance, as a salt of an alkali or alkaline earth, as sodium or calcium chlorid. The formic aldehyde may be in a polymerized or unpolymerized condition, the source thereof being preferably the commercial solution known as "formalin." The salt is preferably dissolved in or with the source of formic aldehyde, and in the case of such solution I prefer to dissolve it to saturation therein; but the source of formic aldehyde and the salt may be brought together in any suitable or desired form or condition, and the resulting product may be of such form or in such condition as the circumstances of its manufacture make necessary or the requirements or convenience of use render desirable. While the proportions may be greatly varied, I find that for a liquid or solution the best results are obtained by dissolving sodium or calcium chlorid to saturation in a commercial or forty-per-cent. solution of formic aldehyde.

My product may be used by heating the solution to drive off the formic aldehyde. This is best done in a formogenic autoclave, as fully set forth in my said application, No. 613,270, (Patent No. 656,061,) whereby the liquid is heated under pressure, the formic-aldehyde vapors being given off in stable and non-polymerized form. The addition of the soluble neutral substance to the solution has the important effect of raising its boiling-point, so that the application of heat is rendered more effective to evolve therefrom non-polymerized and stable vapors of formic aldehyde. The formic-aldehyde vapors are driven off from an aqueous solution at a little below 100° centigrade, while the addition of the soluble substance to the solution raises its boiling-point to above 100° centigrade, and thereby checks vaporization of the water, so that the vapors are formed in a nearly dry state. In addition the substance diminishes the tendency to polymerization and tends to depolymerize the formic aldehyde.

My improved product is convenient as a vehicle for transporting and preserving formic aldehyde and is always ready for treatment when the vapors are to be evolved.

I am well aware that it has been proposed to mix or triturate one part of polymerized formic aldehyde (paraformaldehyde) with five to ten parts of a porous pulverulent substance, such as infusorial earth, starch, inactive salts, &c., for use by scattering the mixed powder over the places or objects which are to be disinfected or preserved, the polymerized formic aldehyde decomposing without application of heat into ordinary formic aldehyde.

My invention is to be clearly distinguished from the foregoing, since instead of inactive or insoluble mineral salts or other non-deliquescent powders, such as are required as the triturating medium or body of such a dusting-powder, I employ an active or soluble substance which when dissolved in a solvent of the formic aldehyde or polymer thereof has the important effect of raising the boiling-point of the solution, as above stated.

Any soluble or deliquescent substance will serve for carrying out my invention, provided only that it must have no reaction with formic aldehyde, being a substance neutral or indifferent thereto.

What I claim is—

1. The improved composition of matter for producing formic-aldehyde vapors, comprising a substance containing formic aldehyde and a substance neutral to formic aldehyde and soluble in a solvent thereof, so that said composition in solution has a higher boiling-point than a simple formic-aldehyde solution, to the effect set forth.

2. The improved composition of matter for producing formic-aldehyde vapors, consisting of an aqueous solution containing formic aldehyde and a mineral substance neutral to formic aldehyde and soluble in a solvent thereof, so that the solution has a higher boiling-point than a simple aqueous formic-aldehyde solution, to the effect set forth.

3. The improved composition of matter for producing formic-aldehyde vapors, comprising a substance containing formic aldehyde and a neutral soluble salt of an alkali or alkaline earth, so that said composition in solution has a higher boiling-point than a simple formic-aldehyde solution, to the effect set forth.

4. The improved composition of matter for producing formic-aldehyde vapors comprising a neutral substance containing formic aldehyde and a soluble chlorid.

5. The improved composition of matter for producing formic-aldehyde vapors comprising a neutral mixture of a substance containing formic aldehyde and sodium chlorid.

6. The improved composition of matter for producing formic-aldehyde vapors consisting of a neutral solution of formic aldehyde, and a substance neutral to formic aldehyde, so that said solution has a higher boiling-point than a simple formic-aldehyde solution, to the effect set forth.

Signed in the presence of two subscribing witnesses.

JEAN JOSEPH AUGUSTE TRILLAT.

Witnesses:
AMÉDÉE COURNOIS,
EDWARD P. MACLEAN.